E. J. HILGENDORF.
CONNECTOR FOR ANGLE RODS.
APPLICATION FILED MAY 12, 1911.

1,053,173.

Patented Feb. 18, 1913.

Witnesses:
Katherine Holt
Clara Muehlbach

Inventor:
Edmund J. Hilgendorf,
By Morsell & Caldwell
Attorneys.

COLUMBIA PLANOGRAPH CO., WASHINGTON, D. C.

UNITED STATES PATENT OFFICE.

EDMUND J. HILGENDORF, OF MILWAUKEE, WISCONSIN.

CONNECTOR FOR ANGLE-RODS.

1,053,173. Specification of Letters Patent. Patented Feb. 18, 1913.

Application filed May 12, 1911. Serial No. 626,669.

*To all whom it may concern:*

Be it known that I, EDMUND J. HILGENDORF, a citizen of the United States, and resident of Milwaukee, in the county of Milwaukee and State of Wisconsin, have invented new and useful Improvements in Connectors for Angle-Rods, of which the following is a description, reference being had to the accompanying drawings, which are a part of this specification.

This invention has for its object to provide a connecting means for angle-rods, such as channel irons, T-irons and the like which are commonly used in building construction, and comprising a sleeve of such shape in cross section as to closely fit with the contour of the ends of the adjoining rods so that said ends may abut and be held firmly in alinement by means of the connector.

It has been common practice to overlap the ends of angle-rods when it is necessary to connect them together and then the overlapping ends are bound together by means of a wire wound around them. This operation involves difficulties and requires considerable time and the resulting connection is objectionable because of the necessity for the two rods being out of alinement or slightly offset with relation to each other.

The object of the present invention is to overcome such objections by providing a sheet metal sleeve closely fitting around the ends of the rods and which may be quickly and easily placed in position by merely slipping it over the end of one rod and then inserting the end of the other rod therein, and in some cases tightening the sleeve around the ends of the rods when they are in place.

With the above and other objects in view the invention consists in the angle-rod connectors herein claimed and all equivalents.

Figure 1:
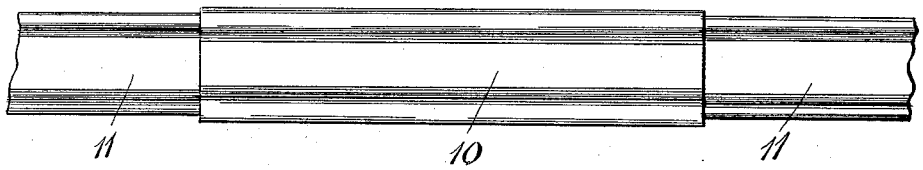
Figure 2:
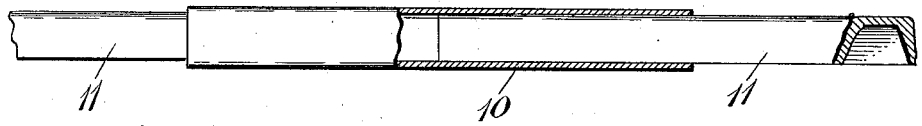
Figure 3:
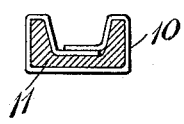
Figure 5:
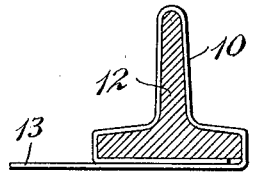
Figure 6:
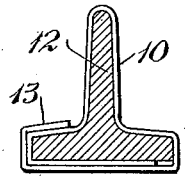
Figure 4:
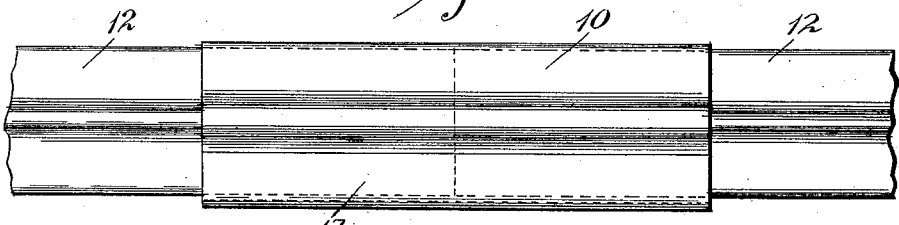

Referring to the accompanying drawings in which like characters of reference indicate the same parts in the different views: Figure 1 is a side view of an angle-rod connector in place for holding together the ends of channel irons; Fig. 2 is a plan view thereof with a portion of the sleeve broken away; Fig. 3 is a transverse sectional view thereof; Fig. 4 is a plan view of an angle-rod connector in place for holding together the ends of T-irons; Fig. 5 is a transverse sectional view thereof before the edge of the sleeve is bent to its final position; and, Fig. 6 is a similar view thereof after this operation is completed.

In these drawings 10 indicates a sleeve, preferably formed of sheet metal bent to a tubular form having the shape in cross section of the contour of angle-rods which it is intended to connect. Such angle-rods may be channel irons 11 or T-irons 12 or any other form of angle-iron, all of which are intended to be comprehended by the term "angle rods" as herein used, and when the sleeve is placed in position on one end of such angle-rod, it forms a socket to receive and closely fit with the end of another angle rod which, when inserted therein, becomes firmly held in connection with the first mentioned angle-rod and in perfect alinement therewith, their two ends abutting, as shown in Fig. 2. With the channel iron 11 it is desirable to overlap the two edges of the sheet metal forming the sleeve at the channel portion thereof, as shown in Fig. 3, but with the T-iron from it is preferable to overlap the edges of the sheet metal forming the sleeve at the straight face of the T-iron, with the outside edge of the sheet metal left projecting beyond the edge of the sleeve so that after the rods are placed therein, such projecting edge may be bent over the edge of the sleeve as shown in Fig. 6 and then pressed tightly against the angle rods so as to pinch the sleeve onto the angle rods and assure a tight connection.

By the use of the sleeve connection of this invention the operation of connecting angle rods together is not only simplified so as to require less time, but the work is neater and the joint is more satisfactory because of the rods being in direct alinement and also there is a considerable saving in angle iron because the rods are only required to abut each other and do not overlap for the length of the connection as before.

What I claim as new and desire to secure by Letters Patent is:

1. The described combination comprising a pair of angle rods, a sheet metal tubular sleeve conforming in shape to the contour of the angle rods, said sleeve having the ends of the angle rods fitting therein, the edges of the sheet metal forming the sleeve being overlapped with the outer edge projecting and adapted to be turned over upon the edge of the sleeve to clamp the sleeve upon the angle rods.

2. A connector for the abutting ends of angle rods comprising a sleeve of sheet metal having the same sectional shape throughout its length as the angle rods and adapted to fit thereon so that the abutment of the angle rods is approximately midway the length of the sleeve.

3. Means for connecting and alining abutting rods of angular cross section comprising a sleeve tubular in form and having the same sectional shape throughout its length as the sectional shape of the rods and adapted to fit upon the ends of both rods and continue a bearing engagement therewith for some distance beyond their abutment to preserve their alinement.

In testimony whereof, I affix my signature, in presence of two witnesses.

EDMUND J. HILGENDORF.

Witnesses:
C. H. KEENEY,
KATHERINE HOLT.